US012800933B2

(12) United States Patent
Gelberg et al.

(10) Patent No.: US 12,800,933 B2
(45) Date of Patent: Nov. 17, 2026

(54) TRANSPARENT LIGHTGUIDE FOR VIEWING A SCENE AND A NEAR-EYE DISPLAY

(71) Applicant: Lumus Ltd., Ness Ziona (IL)

(72) Inventors: Jonathan Gelberg, Modiin (IL); Tsion Eisenfeld, Ashkelon (IL)

(73) Assignee: LUMUS LTD., Ness Ziona (IL)

( * ) Notice: Subject to any disclaimer, the term of this patent is extended or adjusted under 35 U.S.C. 154(b) by 272 days.

(21) Appl. No.: 18/818,684

(22) Filed: Aug. 29, 2024

(65) Prior Publication Data

US 2024/0419000 A1 Dec. 19, 2024

Related U.S. Application Data

(63) Continuation of application No. 17/265,586, filed as application No. PCT/IB2020/054289 on May 6, 2020, now Pat. No. 12,117,614.

(60) Provisional application No. 62/844,771, filed on May 8, 2019, provisional application No. 62/843,644, filed on May 6, 2019.

(51) Int. Cl.
*G02B 27/01* (2006.01)
*G02B 27/14* (2006.01)

(52) U.S. Cl.
CPC ....... *G02B 27/0172* (2013.01); *G02B 27/145* (2013.01)

(58) Field of Classification Search
CPC ......................... G02B 27/0172; G02B 27/145; G02B 27/017; G02B 2027/0174; G02B 27/0176; G02B 2027/0178
See application file for complete search history.

(56) References Cited

U.S. PATENT DOCUMENTS 6,829,095 B2 12/2004 Amitai
7,391,573 B2 * 6/2008 Amitai .................. G02B 27/28 359/636
7,457,040 B2 * 11/2008 Amitai ............... G02B 27/1073 359/857
7,576,916 B2 * 8/2009 Amitai .................. G02B 6/003 359/485.02

(Continued)

FOREIGN PATENT DOCUMENTS

CN 104503087 B 7/2019
JP 2007010830 1/2007

*Primary Examiner* — Bao-Luan Q Le
(74) *Attorney, Agent, or Firm* — Rivka Friedman

(57) ABSTRACT

A light-guide optical element (LOE) for simultaneous viewing, of a real scene and of a projected image introduced into the LOE, having a transparent block along which light conveying a projected image propagates by internal reflection, and a plurality of internal partially reflecting surfaces obliquely oriented and configured so as to couple-out a part of said light, wherein the reflectance of each of the partially reflecting surfaces is such that the total power of the light that is coupled out is less than one third of the total power of the light that is introduced into the LOE. In some embodiments, the light of the projected image is polarized and the reflectance of the partially reflecting surfaces for light polarized in an orthogonal orientation is substantially reduced. In some embodiments, the reflectance of the partially reflecting surfaces for light not reaching the viewer is substantially reduced.

16 Claims, 6 Drawing Sheets

(56) References Cited

U.S. PATENT DOCUMENTS

| | | | | |
|---|---|---|---|---|
| 7,643,214 | B2 * | 1/2010 | Amitai | G02B 27/0081 359/629 |
| 7,672,055 | B2 * | 3/2010 | Amitai | G02B 27/0172 359/485.06 |
| 7,724,441 | B2 * | 5/2010 | Amitai | G02B 27/1073 362/23.15 |
| 7,724,442 | B2 * | 5/2010 | Amitai | G02B 27/28 359/630 |
| 8,004,765 | B2 * | 8/2011 | Amitai | G02B 6/003 359/627 |
| 8,471,967 | B2 | 6/2013 | Miao | |
| 8,643,948 | B2 * | 2/2014 | Amitai | G02B 27/0025 359/489.09 |
| 8,810,914 | B2 * | 8/2014 | Amitai | G02B 27/106 385/36 |
| 8,861,081 | B2 * | 10/2014 | Mansharof | H04N 13/344 385/11 |
| 8,902,503 | B2 * | 12/2014 | Amitai | G02B 5/3083 359/489.09 |
| 9,069,180 | B2 * | 6/2015 | Amitai | G02B 27/28 |
| 9,104,036 | B2 * | 8/2015 | Amitai | G02F 1/0136 |
| 9,207,457 | B2 * | 12/2015 | Amitai | G02B 6/2766 |
| 9,279,986 | B2 * | 3/2016 | Amitai | G02B 27/0172 |
| 9,316,832 | B2 * | 4/2016 | Levin | G02B 27/106 |
| 9,417,453 | B2 * | 8/2016 | Amitai | G02B 30/25 |
| 9,448,408 | B2 * | 9/2016 | Amitai | G02B 6/272 |
| 9,500,869 | B2 * | 11/2016 | Amitai | G02B 5/30 |
| 9,513,481 | B2 * | 12/2016 | Levin | G02B 6/2773 |
| 9,740,013 | B2 * | 8/2017 | Amitai | G02B 6/003 |
| 10,078,222 | B2 | 9/2018 | Komatsu et al. | |
| 10,509,229 | B2 * | 12/2019 | Matsuki | G02B 6/0055 |
| 10,571,698 | B2 | 2/2020 | Matsuki et al. | |
| 2005/0180687 | A1 * | 8/2005 | Amitai | G02B 27/286 385/31 |
| 2007/0070859 | A1 * | 3/2007 | Hirayama | G02B 27/0172 369/112.04 |
| 2007/0091445 | A1 * | 4/2007 | Amitai | G02B 27/0101 359/630 |
| 2007/0097513 | A1 * | 5/2007 | Amitai | G02B 6/0035 359/630 |
| 2008/0025667 | A1 * | 1/2008 | Amitai | G02B 6/003 385/36 |
| 2008/0158685 | A1 * | 7/2008 | Amitai | G02B 27/286 359/630 |
| 2008/0198471 | A1 * | 8/2008 | Amitai | G02B 27/285 359/630 |
| 2008/0285140 | A1 * | 11/2008 | Amitai | G02B 6/0035 359/630 |
| 2009/0052046 | A1 * | 2/2009 | Amitai | G02B 6/0055 359/629 |
| 2009/0097127 | A1 * | 4/2009 | Amitai | G02B 27/0172 359/633 |
| 2010/0202048 | A1 * | 8/2010 | Amitai | G02B 27/28 359/485.02 |
| 2013/0016292 | A1 | 1/2013 | Miao et al. | |
| 2014/0118813 | A1 * | 5/2014 | Amitai | G02F 1/0136 359/489.08 |
| 2014/0118836 | A1 * | 5/2014 | Amitai | G02B 6/2773 359/633 |
| 2014/0118837 | A1 * | 5/2014 | Amitai | G02B 27/0172 359/633 |
| 2014/0126051 | A1 * | 5/2014 | Amitai | G02B 27/0172 359/465 |
| 2014/0126052 | A1 * | 5/2014 | Amitai | G02B 6/2766 359/641 |
| 2014/0126056 | A1 * | 5/2014 | Amitai | G02B 6/272 359/489.07 |
| 2014/0126057 | A1 * | 5/2014 | Amitai | G02B 27/0101 359/489.08 |
| 2014/0126175 | A1 * | 5/2014 | Amitai | G02B 6/34 362/19 |
| 2015/0277127 | A1 * | 10/2015 | Amitai | G02B 5/045 359/641 |
| 2015/0293360 | A1 * | 10/2015 | Amitai | G02B 6/003 359/633 |
| 2016/0187656 | A1 * | 6/2016 | Amitai | G02B 27/283 359/633 |
| 2016/0195724 | A1 * | 7/2016 | Levin | G02B 5/04 359/484.01 |
| 2016/0320621 | A1 * | 11/2016 | Biteau | G02C 11/10 |
| 2016/0349518 | A1 * | 12/2016 | Amitai | G02B 27/28 |
| 2018/0284447 | A1 * | 10/2018 | Matsuki | G02B 27/0172 |
| 2021/0033862 | A1 * | 2/2021 | Danziger | G02B 5/3025 |

* cited by examiner

TRANSPARENT LIGHTGUIDE FOR VIEWING A SCENE AND A NEAR-EYE DISPLAY

TECHNICAL FIELD

The invention is directed generally to head-mounted display devices and particularly to light-guide optical elements that are part of such devices.

BACKGROUND OF THE INVENTION

A device that is worn by a viewer for simultaneous viewing of a real scene and of a projected image from a display device is widely known and is generally referred to as a "head-mounted display" (HMD) or "near-eye display" (NED). Such a device is generally constructed as goggles or spectacles or as a helmet or visor, to be worn on the head of the viewer, and includes one or two image projectors (each including an electro-optic display component) and optical components to deliver the projected images into the viewer's eyes. In some configurations of an HMD, known in the art, one such optical component is a lightguide, which is positioned in front of each of the viewer's eyes.

Such a lightguide (also referred to interchangeably as "waveguide", or "substrate") serves to expand the field of view (i.e. the angular size of the screen of the display component) and the viewing window (i.e., the window within which the viewer's eye may be located so as to view the entire display screen, also known as an "eye motion box"). In general, such a lightguide is a block (or slab) of transparent material, with two parallel major surfaces, along which the light, conveying the collimated image projected from the display component, propagates by total internal reflection. The block includes a structural coupling-out arrangement, functional so that part of that light is coupled-out, through one of the major surfaces, towards the corresponding eye of the viewer.

In some configurations of the lightguide, known as diffractive lightguides, the coupling-out arrangement includes a diffractive structure in one or both of the major surfaces. In other configurations, known as reflective lightguides and particularly as "lightguide optical elements" (LOEs), the coupling-out arrangement includes a set of obliquely angled mutually parallel partially reflective surfaces, also known interchangeably as facets, internal to the block.

In some cases, such as when the HMD is in the form of spectacles, it may be desired that the coupling-out arrangement be less visible, or even invisible, to outside observers.

SUMMARY OF THE INVENTION

The present invention seeks to provide improvements to lightguides used in head-mounted displays (HMDs), such that would diminish the undesirable visibility effects otherwise experienced by an external observer when observing through such a lightguide the face of a viewer, wearing the HMD. Such an effect may be caused by part of the light reflected from the viewer's eye and face being coupled into the lightguide, thus attenuating the light reaching the external observer, resulting in apparent darkening of the lightguide in the external observer's view and masking the face and eye of the viewer. Another undesirable visibility effect in lightguides of prior art may be caused by light within the lightguide that is reflected from an end surface and propagates backwards, whereby it is coupled out toward the outside observer, who perceives it as a glare. Thus certain embodiments of the invention provide various techniques to increase the light transmission through the lightguide between the viewer's face and an outside observer and to decrease the amount of other light projected from the lightguide toward the outside observer.

The improvements will be described, by way of non-exclusive example, in terms of embodiments of a configuration of a lightguide that includes partially reflective surfaces. Such a reflective lightguide, or lightguide optical element (LOE) of prior art is described, for example, in U.S. Pat. No. 6,829,095, entitled "Substrate-guided optical beam expander" and incorporated herein by reference. However improvements according to the invention are applicable, in whole or in part, also to other embodiments and configurations of a lightguide for HMDs.

Specifically there is disclosed a light-guide optical element (LOE) for simultaneous viewing, by an eye of a viewer, of a real scene and of a projected image introduced into the LOE, the LOE comprising:

- a block of transparent material having a first major surface and a second major surface, parallel to the first major surface, so that light conveying a projected image introduced into the LOE propagates within the LOE by internal reflection at the first and second major surfaces, and
- a plurality of mutually-parallel partially reflecting surfaces internal to the block and obliquely oriented relative to the first major surface, the partially reflecting surfaces being configured so as to couple-out a part of the light through the second major surface,
- wherein the reflectance of each of the partially reflecting surfaces is such that the total power of the light that is coupled out is less than one third of the total power of the light conveying the projected image that is introduced into the LOE.

In some embodiments the reflectance of each of the partially reflecting surfaces is such that the total power of the light that is coupled out is less than one fifth, and in some of the embodiments less than one tenth, of the total power of the light conveying the projected image that is introduced into the LOE.

In some embodiments the reflectance of each of the partially reflecting surfaces is less than 13% and in some of the embodiments it is less than 5%.

Also disclosed is a light-guide optical element (LOE) for simultaneous viewing, by an eye of a viewer, of a real scene and of a projected image, conveyed by light that is polarized in a first orientation and introduced into the LOE, the LOE comprising:

- a block of transparent material having a first major surface and a second major surface parallel to the first major surface so that light conveying a projected image introduced into the LOE propagates within the LOE by internal reflection at the first and second major surfaces, and
- a plurality of mutually-parallel partially reflecting surfaces internal to the block and obliquely oriented relative to the first major surface so as to couple-out a part of the light towards the eye of the viewer,
- wherein the reflectance of each of the partially reflecting surfaces in a direction normal to the major surfaces for light polarized in a second orientation, orthogonal to the first orientation, is less than one third of its reflectance in the direction for light polarized in the first orientation.

The first polarized orientation may be S-polarized relative to the partially reflecting surfaces. In some embodiments the partially reflecting surfaces are substantially transparent to P-polarization for an angular range of at least about 30 degrees including a direction normal to the first major surface.

Also disclosed is a light-guide optical element (LOE) for simultaneous viewing, by an eye of a viewer, of a real scene and of a projected image introduced into the LOE, the LOE comprising:

a block of transparent material having a first major surface and a second major surface parallel to the first major surface so that light conveying a projected image, introduced into the LOE, propagates along the LOE in a first direction by internal reflection at the first and second major surfaces, there being defined, in a plane outside and parallel to the first major surface, an eye motion box of a given size, and a plurality of mutually-parallel partially reflecting surfaces internal to the block, arranged sequentially along the first direction and obliquely oriented relative to the first major surface so as to couple-out a part of the light towards the eye motion box, wherein the reflectance of the last one in sequence of the partially reflecting surfaces for the part of the light that is coupled out from it toward any point within the eye motion box is at least twice its reflectance for light travelling in a direction normal to the first and second major surfaces.

In some embodiments the reflectance of the last one in sequence of the partially reflecting surfaces for the part of the light that is coupled out from it toward any point within the eye motion box is at least four times greater than its reflectance for light travelling in a direction normal to the first and second major surfaces.

In some of the embodiments the block has an end surface onto which light propagating within the LOE that passes the partially reflecting surfaces impinges, wherein the end surface is coated with a light-absorbing layer, configured to absorb light introduced into the LOE and not coupled out. The light-absorbing layer may be implemented as black paint applied to a rough end surface.

Also disclosed is an optical system for simultaneous viewing, by a viewer, of a natural scene and of an image on a near-eye image projector, the optical system comprising:

the LOE of any one of claims 1-10; and a support structure deployed to support the LOE on the head of the viewer in facing relation to at least one eye of the viewer.

BRIEF DESCRIPTION OF THE DRAWINGS

The invention is herein described, by way of example only, with reference to the accompanying drawings, wherein.

DETAILED DESCRIPTION OF PREFERRED EMBODIMENTS

Figure 1A:
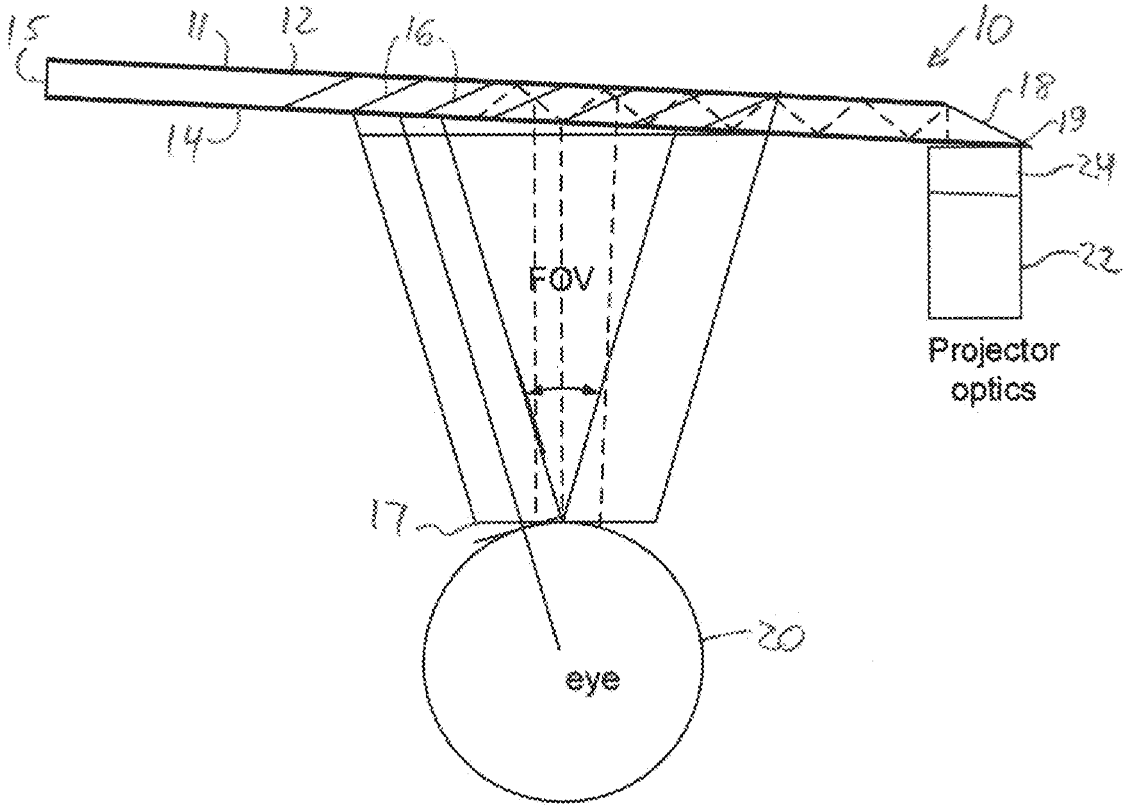
FIG. 1A is a sectional top view of an examplary lightguide optical element (LOE) as used in a head-mounted display (HMD)

FIG. 1A illustrates schematically, by way of introduction, a head-mounted display (HMD) formed, in this example, as spectacles to be worn by a viewer, that includes a lightguide optical element (LOE) 10, with partially reflective surfaces, which is positioned in front of an eye 20 of the viewer when wearing the HMD. Additionally it includes— an image projector 22 (which, in turn, includes an electro-optical display device or spatial light modulator such as an LCOS device), operative to generate images according to signals fed to it, and a collimating optical assembly, configured to project light corresponding to a collimated version of the image—all not shown) and coupling optics 24, to couple the projected image into the LOE 10.

In some configurations of the HMD there may be a single image projector, associated with one of the eyes, in other configurations there may be two image projectors, each associated with a corresponding one of the viewer's eyes, and in yet other configurations there may be a single image projector, arranged to project the image into two LOEs, associated with corresponding eyes, or into a single long LOE, extending in front of both eyes.

The lightguide optical element (LOE) 10 is shown in FIG. 1A in a horizontal cross-sectional view, with tracing of selected light rays of the collimated image as they propagate within the LOE and out toward the viewer. The LOE 10 is basically an elongated block 11, constructed of transparent material and having two mutually parallel major surfaces—a front surface 12 and a rear surface 14. Near one end of the block 11 there is a coupling-in arrangement associated with an entrance window, through which the collimated image is introduced into the LOE. In this example it is an oblique reflective surface 18, with an entrance window 19 defined adjacent to it on the rear surface 14. In other LOEs, for example, the entrance window may be on an angled prism attached to one of the major surfaces or the entrance window may be at an end surface of the block. Embedded in block 11 is a series of oblique partially reflective surfaces 16, all mutually parallel, to be referred to as "facets". Adjacent to the entire group of partially reflective surfaces 16 there is defined, at a certain distance from the rear surface 14 and parallel to it, a viewing region 17, also known as an eye motion box, which signifies an area within which an eye of the viewer may be located in order to be able to view the entire image, allowing for motion of the eye and some leeway in the placement of the HMD relative to the eye 20.

It is noted that, while in the illustrated example the entrance window is on the rear surface, in other configurations of an HMD a corresponding LOE may be configured with an entrance window on the front surface or on an end surface of the block 11. The present invention addresses also such configurations.

As illustrated by the selected rays, image-conveying light from the coupling optics 24 enters the block 11 through the entrance window 19 and is deflected, in this example, by the oblique reflective surface 18 so as to propagate along the block 11 while undergoing total internal reflections from the major surfaces 12 and 14. In a configuration where the entrance window is on an end surface, the light entering it may proceed directly (i.e., without deflection) to propagate along the block. During this propagation the light is intercepted by the partially reflective surfaces (facets) 16 and part of it is deflected, or coupled out, into the viewing window (eye motion box) 17.

One of the key challenges in the design of an LOE for any near-eye display device (such as an augmented-reality device, as well as a virtual-reality device) is to maximize optical throughput from the light source to the eye of the viewer, in order to diminish energy consumption, thus lengthening battery life. It is therefore common practice in state of the art reflective LOE design to maximize overall reflectance of the facets so as to maximize the image intensity reaching the eye of the viewer. At the same time the reflectance of the facets typically varies between them in order to achieve a uniform intensity image across the field of view and over the viewing window, as perceived by the viewer. More specifically, as the light propagates along the block 11 and part of it is coupled out by the first facet, the intensity of the remaining light diminishes, requiring the following facets to have commensurately higher reflectance so that the intensity of the light coupled out remains constant; thus the last facet to be intercepted by the light should have the highest reflectance.

Another challenge in the design of an LOE, specific to such that is part of an HMD, is that it must be transparent enough for the viewer to clearly see also the natural scene. This requirement conflicts with the aforementioned requirement of maximum reflectance of the facets, in that high reflectance is practically equivalent to low transmittance, which, in turn, attenuates light reaching the viewer's eye from the natural scene. Thus the design of conventional LOEs for HMDs is subject to a compromise, whereby the reflectance of the facets is reduced proportionally to achieve a desired minimum value of transmittance for light from the natural scene.

Yet, in certain conventional LOE designs the facets remain substantially visible to an external observer (as mentioned in the Summary section above). This is due to their transmittance being relatively low, thus attenuating light reflected from the viewer's face and eye 20, through the block 11 of the LOE in a direction generally normal to its major surfaces 12 and 14, to the external observer's eyes (not shown). This effect is demonstrated schematically in FIG. 1B, which is a front view of the LOE 10 as it would appear to the external observer. Here the facets 16 appear as strips of varying darkness, obscuring the viewer's face; the leftmost facet appears darkest, since it is designed with the highest reflectance and thus—with the lowest transmittance. In these designs the facets may also produce a glare, visible to the external observer, which is due to remaining propagating light being reflected from an end face 15 of the block 11 and coupled out by the facets 16 through the front major surface 12 toward the observer's eyes.

In what follows will be described examplary embodiments of lightguide optical elements that include novel features designed to reduce the effects described above, such as the visibility of the facets to an external viewer. These features will be described each in terms of an appropriate examplary embodiment. However, some other embodiments may include two or more of these features simultaneously, as may readily be conceived by persons ordinarily skilled in the art. Moreover, some or all of these features may be included in embodiments of LOEs of various configurations, particularly reflective and diffractive LOEs.

A guiding principle of certain embodiments of the present invention is to reduce reflectance of the facets so as to increase their overall transmittance for light passing across the LOE, making them seem transparent and thus invisible to an outside observer.

Moreover, according to a typical optimized reflective LOE design of prior art, the reflectance of facets vary along the LOE, from the first to the last encountered facet, extending typically from 10% to 25% within the ranges of incidence angles, polarization orientation and spectral band of interest. The ranges of interest of incidence angles are determined by optical-geometric consideration in the design of the LOE and of the HMD, of which the LOE is a part. The ranges of interest of polarization orientation and spectral band are largely determined by the characteristics of the image projector or by operational requirements. It is noted that, while the optimal design seeks to optimize the reflectance of the facets within these ranges of interest, reflectance values for any values of incidence angles, polarization orientation and spectral band outside these ranges are typically not constrained in the design. Accordingly, a further guiding principle of certain embodiments of the present invention is to reduce or possibly minimize reflectance of facets outside any one or more of these ranges, thus increasing their transmittance for light across the LOE.

In a first examplary embodiment of the present invention, or according to a first aspect of the invention, the overall reflectance of each facet, including that within the range of angles, polarization state and spectral band of interest, is substantially reduced by design, as compared with that in the above mentioned prior art design.

Figure 2:
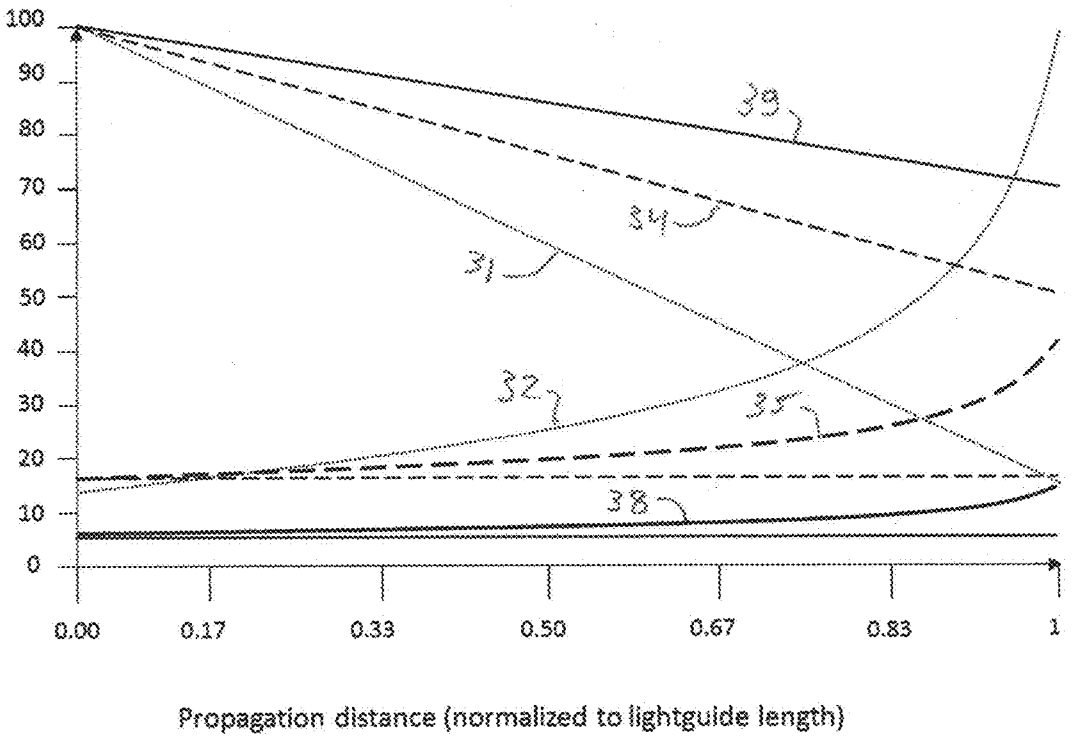
FIG. 2 is a graph, showing typical reflectance values of partially reflective surfaces along a LOE according to the invention, compared to those in an LOE of prior art.

FIG. 2 is a comparative plot of reflectance values of facets (ascending lines) and of the intensity of propagating light (descending lines) along the LOE. The horizontal scale is relative distances along the LOE and the vertical scale is percentage of a maximum value. The dotted lines represent optimal values for a LOE designed for use in a virtual-reality device (which is outside the scope of the present invention). Here the optimal design calls for all of the light energy entering the LOE to be coupled out, so as to maximize efficiency in viewing the display image, while keeping the intensity of the light coupled out uniform. Accordingly, the line 31, representing the intensity of the propagating light, descends linearly to nearly zero, while the line 32, representing the reflectance of successive facets, ascends nearly exponentially with the corresponding increase in reflectance. As a result, the intensity of light coupled out toward the viewer is roughly uniform. It is noted that the lines represent optimal design values; in actuality, the inclined lines would partly resemble steps, corresponding to the facets.

The dashed lines represent typical values for a LOE of prior art, designed for use in a head-mounted display (HMD), wherein reflectances have been chosen to provide a relatively clear view of the natural scene. These lines are seen to be similar to the dotted lines, but with reduced slopes. Thus the linearly descending line 34, starting again at 100 (signifying the full intensity of light entering the LOE), reaches only about 50% at the end, signifying that only about 50% of the propagating light energy has been coupled out (toward the viewing window). Correspondingly, the ascending line 35 reaches only about 42, signifying that the reflectance of the last facet is only about 42%. This results in its transmittance at the pertinent angles of incidence being about 58% and presumably being commensurately high also in a direction across the LOE, along which the natural scene is being viewed—high enough for the scene to appear satisfactorily clear.

As explained above, the latter transmittance is not high enough to avoid obscuring the face and eye of a user of the HMD and the attendant visibility of the facet to an outside observer. In order to correct this, the reflectance of facets in examplary embodiments of the invention, corresponding to the first aspect of the present invention, is further substantially reduced, as represented by the solid plot lines in FIG. 2. Here the ascending solid line 38 reaches only about 13, signifying that the total reflectance of the last (i.e., highest reflectivity) facet is preferably no more than about 13% (and in some particularly preferred embodiments no more than about 5%), and the linear solid line 39 descends only to about 63, signifying that only about 37% of the propagating light energy is coupled out. As a result, the transmittance of the last facet is raised to approximately 87%, which significantly reduces visibility of the facet to an outsider observing the user's face; the transmittance of the other facets is even greater. Also as a result, in this preferred example, at least 63% of the image intensity coupled into the LOE continues propagating along the LOE beyond the last facet and therefore goes to waste. In other particularly preferred examples, the proportion of coupled-in illumination which propagates beyond the last facet is greater than two-thirds, and in certain particularly preferred cases, greater than 80%, or even 90%. Thus, in this embodiment, a counter-intuitive design compromise has been made whereby optical efficiency of the LOE has been significantly reduced in order to substantially diminish visibility, or render invisible, the facets as observed by an external viewer.

It is noted that in the examplary embodiment the reduction of the reflectance of the last facet, relative to its value in a prior-art design is by a factor of 13%/42%=0.31. More generally in embodiments according to this first aspect of the invention, the reflectance of facets is reduced by a factor ranging between 0.5 and 0.1, preferably between 0.4 and 0.25, as compared to a conventional optimal design.

In a second examplary embodiment of the present invention, corresponding to a second aspect of the invention, it is assumed that the image-conveying light that enters (or is coupled into) the LOE is S-polarized relative to the facets. This may, in some HMDs, be due to the image projector itself inherently emitting polarized light (e.g., a liquid-crystal display) or due to a polarizing filter being interposed in the path between the image projector (or the collimating assembly) and the LOE. According to a novel feature of this second aspect, the reflectance of the facets for P-polarized light is minimized or substantially reduced, relative to their reflectance for S-polarized light. In some embodiments the facets are substantially transparent to P-polarization over an angular range of at least about 30 degrees that includes an incident light direction normal to the first major surface. This maximizes the transmittance of the facets for P-polarized light, allowing more of the light emanating from the viewer's face, to reach an outside observer, thus rendering the facets to be more transparent and less visible to him. It is noted that this feature is applied in addition to reflectance optimization for S-polarized light, which may be according to the conventional approach or according to the first aspect of the present invention. The term "substantially transparent" is used in its normal sense. Quantitatively, it typically refers to transmittance in excess of 95%, and most preferably in excess of 98%.

Figure 3A:
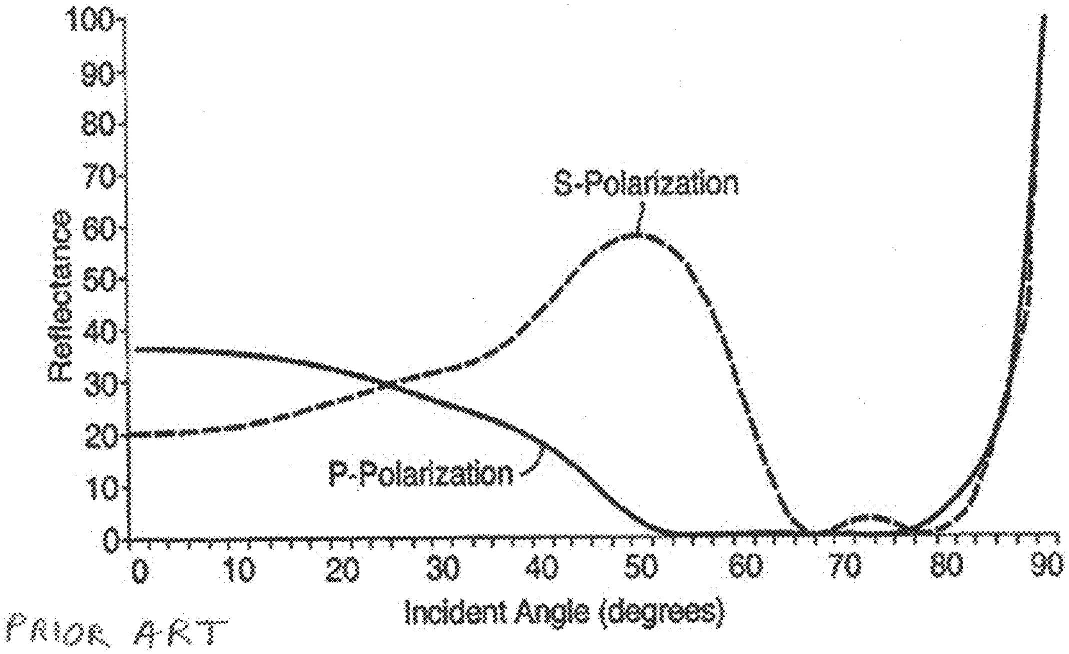
FIG. 3A is a graph, showing typical reflectance values for two different orthogonal polarization orientations of a partially reflective surface in an LOE of prior art.
Figure 3B:
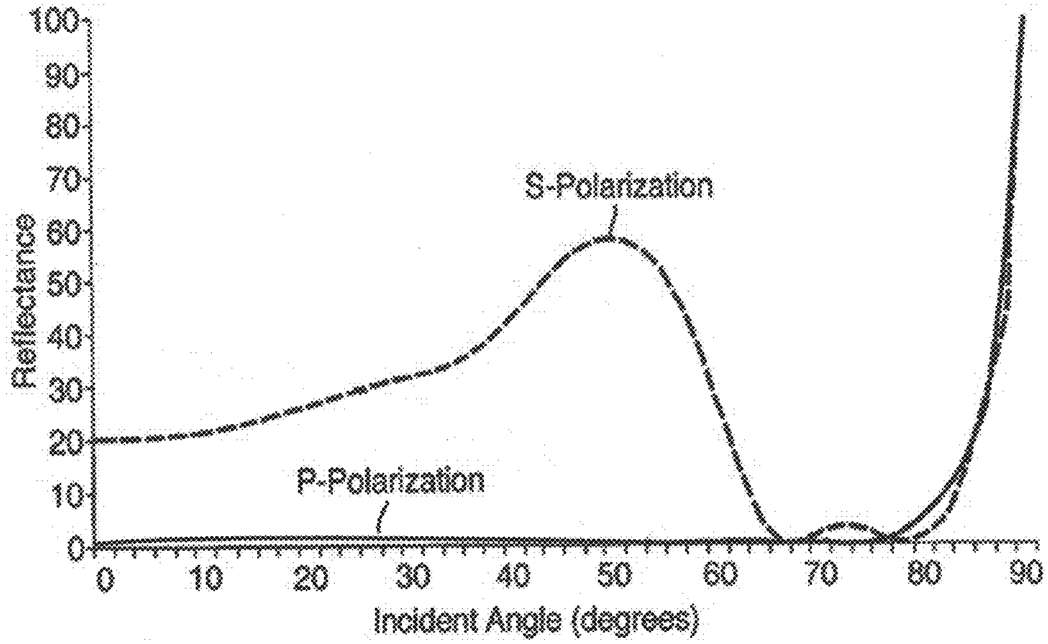
FIG. 3B is a graph, showing typical reflectance values for two different orthogonal polarization orientations of a partially reflective surface in an LOE according to the invention.

FIG. 3A shows, by way of example, the reflectance of a typical facet, in a conventional LOE, for two polarization orientations, namely P-polarization and S-polarization, orthogonal to it, as a function of the angle of an incident light beam. FIG. 3B is a similar plot of reflectances for a LOE in an examplary embodiment corresponding to the second aspect of the invention. In this embodiment the reflectance of S-polarized incident light, within the range of incidence angles of interest, is optimized to values representing either a balance between efficient display image transmission and natural scene visibility, i.e. typically in the range of 10%-25%, or reduced reflectance according to the first aspect of the present invention, described above. However, the reflectance of P-polarized incident light in or near a direction normal to the major block surfaces is substantially reduced, as clearly seen in the FIG. 5B when compared to FIG. 5A. Preferably this reduction is by a factor of at least 4, more preferably—of at least 8. Additionally, or alternatively, the value of reflectance for P-polarization in that direction is preferably no more than about a third, more preferably a fifth, of the value of the corresponding reflectance of the facet for S-polarization.

In a third examplary embodiment of the present invention, corresponding to a third aspect of the invention which can be combined with one or both of the first two aspects, the reflectivity of any of the facets at incidence angles different from the range of incidence angles that will direct the incoming image-conveying light, propagating along the LOE, towards the wearer's eye, or more generally towards the eye motion box, are substantially reduced. The range of incidence angles over which reflectance is thus reduced includes, in particular, those corresponding to the direction of light passing across the LOE—such as from the viewer's face and eye towards an outside viewer. This is equivalent to increased transmittance along that direction, rendering the facets less visible.

Figure 4A:
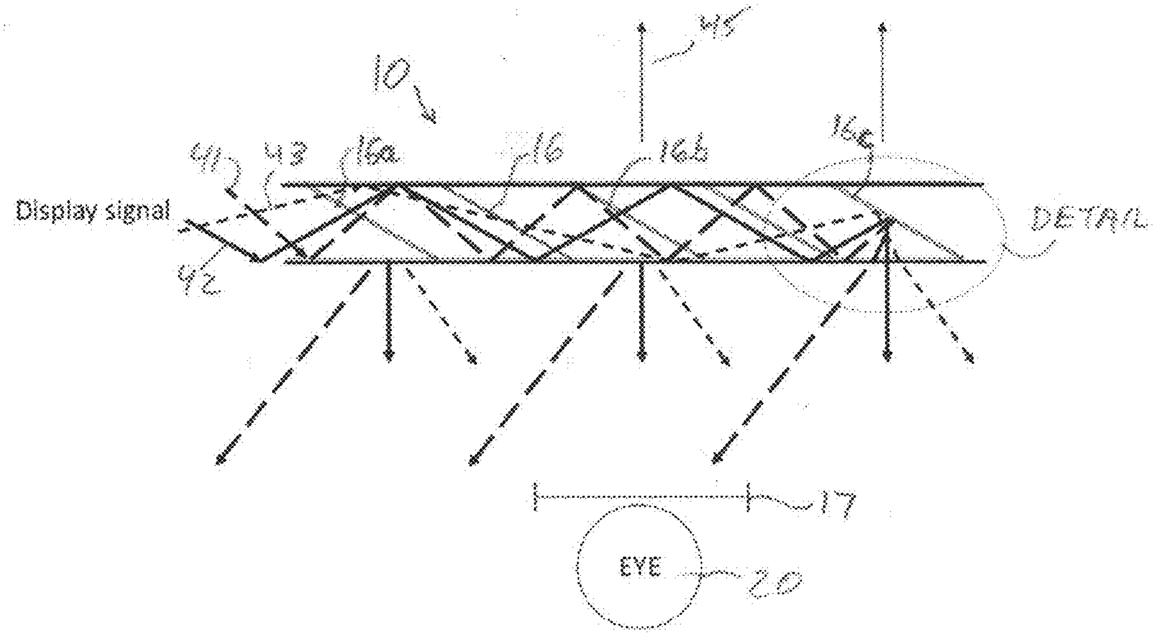
FIG. 4A is a sectional top view of the LOE of FIG. 1A, showing certain ray traces.

The third aspect of the invention will now be further explained, by way of example, with reference to FIG. 4A, which shows a sectional view of an examplary typical LOE 10, with rays of display signal (i.e., image-conveying light) propagating therethrough from the left end and deflected (or coupled out) by means of five facets 16. The rays shown are central rays originally emanating from selected three points across the displayed image, namely: Rays depicted as solid lines 42 emanate from a central point in the image; rays depicted as long dashes 41 emanate from a rightmost point (as seen by the viewer) of the image; rays depicted as short dashes 43 emanate from a leftmost point (as seen by the viewer) of the image. As can be clearly seen in the illustration, rays from different image points reach the eye 20 through different facets. For example, rays reaching the eye from the leftmost point (short dashes) pass mainly through the first (leftmost) facet 16*a*, rays reaching the eye from a middle point (solid lines) pass mainly through the third (middle) facet 16*b* and rays reaching the eye from a rightmost point (long dashes) pass mainly through the fifth (rightmost) facet 16*c*. For each such ray there is a unique incidence angle at the corresponding facet. More generally, there will be, for each facet, a given range of incidence angle (from a corresponding part of the image) that direct rays towards any point within the eye motion box (EMB) 17, where it may enter the eye 20.

Figure 1B:
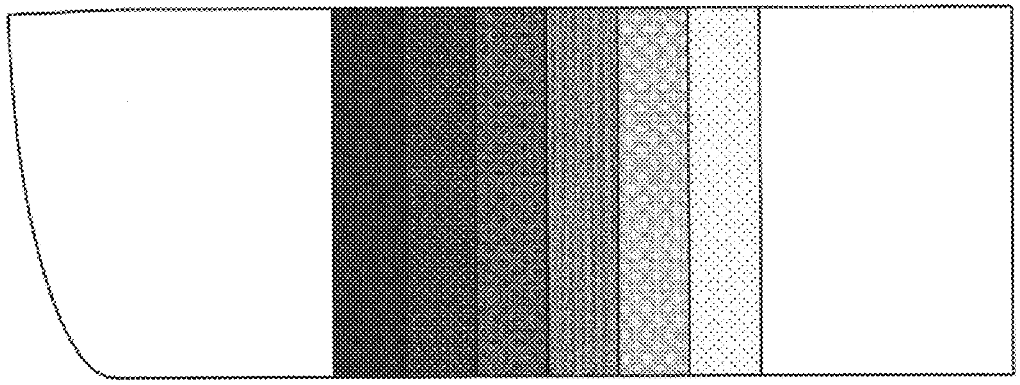
FIG. 1B is a schematic front view of the LOE of FIG. 1A as perceived by an external observer.
Figure 4B:
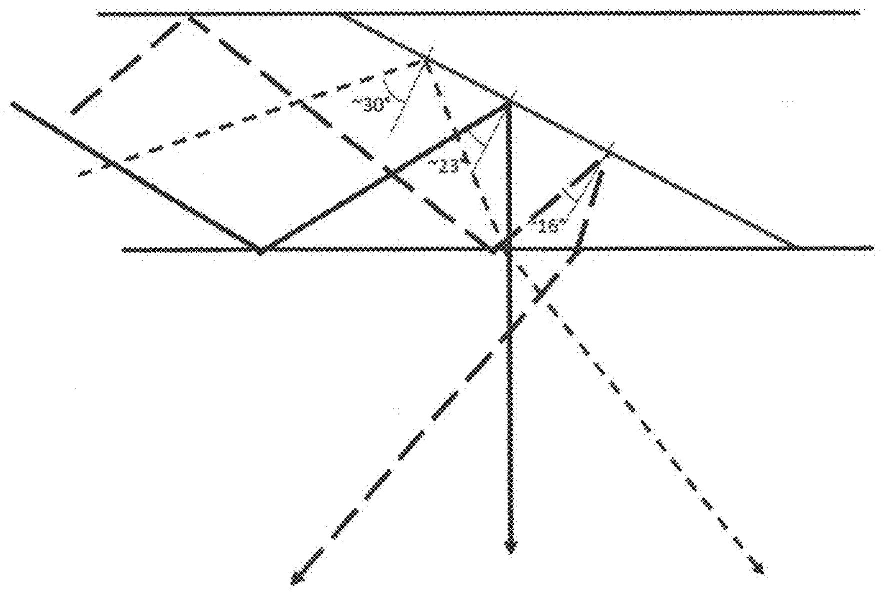
FIG. 4B is an enlarged view of a detail in the LOE of FIG. 4A.

Attention will now be drawn to the last (rightmost) facet 16*c* in the sequence of facets through which the image-conveying light propagates, which by design has the highest reflectance (as explained above and as shown, for example, at the right end of the plot of FIG. 2); it is therefore the one that conventionally has the least transmittance to light passing across the LOE and thus is most visible to an outside observer (as demonstrate, for example by the leftmost band in FIG. 1B). This facet 16*c* and the rays reflected by it are shown enlarged in FIG. 4B, which shows the encircled area marked as detail in FIG. 4A. It will be observed that the three representative rays arrive at unique angles of incidence, as marked in the drawing. Thus, in the present example, the ray from the image left (short dashes) is incident at an angle of about 30 degrees, the ray from the image center (solid line) is incident at about 23 degrees and the ray from the image right (long dashes) is incident at about 16 degrees. It is noted that the same angles of incidence apply also to all the other facets.

In this case, the only ray of interest is that from the right side of the image (long dashes), as it alone reaches the EMB 17. More generally, a range of incidence angles near 16 degrees, at which rays emanating from close by regions of the image are reflected into the EMB 17. This is the range over which reflectance must remain high according to the design (or possibly reduced according to the first and/or second aspect of the invention). On the other hand, the reflectance of the facet 16*c* for incoming light signal at angles substantially different from the aforementioned design range are, according to the third aspect of the invention, reduced relative to the reflectance values at the design range.

Referring again to FIG. 4A, it is seen that light crossing the LOE upwards in the direction indicated by vertical arrows 45, such as that reflected from the face of a viewer towards an outside observer, passes through facet 16*c* (as well as all the other facets) at an incidence angle substantially different from the aforementioned range. As may be observed in FIG. 4B, this angle is about 23 degrees. It is therefore, in the present example, the range of incidence angles around 23 degrees that the reflectance of this facet 16*c* should be considerable reduced, so as to increase transmittance in the cross direction (arrows 45) and thus reduce visibility of the facet.

More generally in embodiments according to the third aspect of the invention, the reflectance of the last facet in the sequence for the part of the light that is coupled out from it toward any point within the eye motion box is preferably at least twice its reflectance for light travelling in a direction normal to the major surfaces.

Figure 4C:
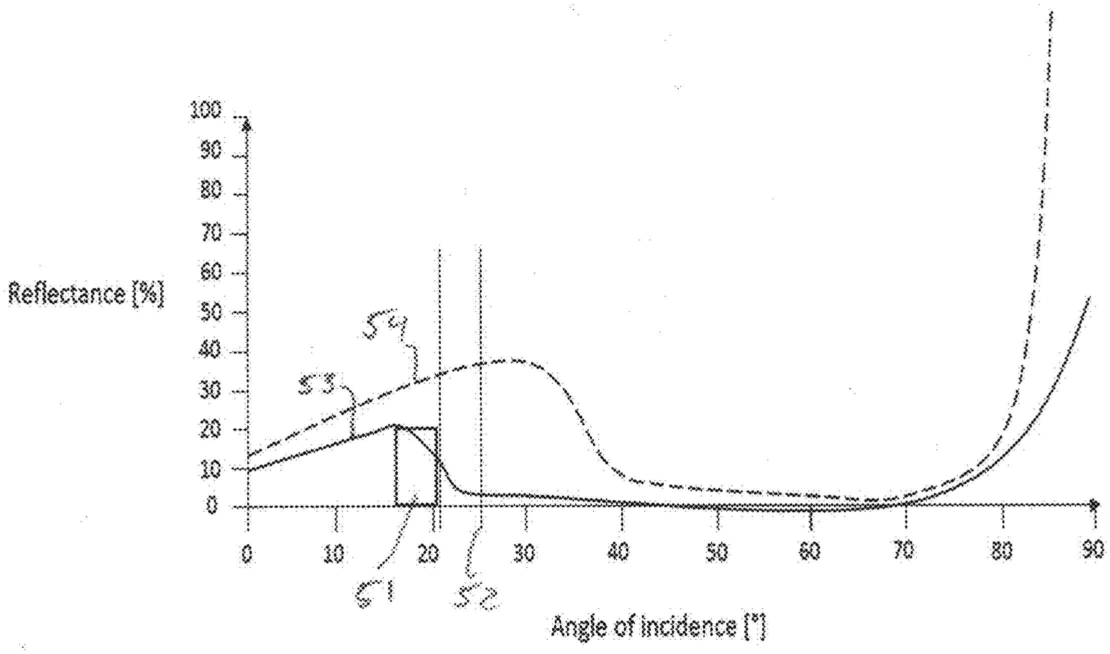
FIG. 4C is a graph of reflectance as a function of direction in three partially reflecting surfaces of the LOE of FIG. 1B.

FIG. 4C depicts schematically the design aim for facet 16*c* of FIG. 4A, namely relatively high reflectance for incidence angles in the range of 16 to 21 degrees (for rays reaching the EMB), as depicted by rectangle 51 and relatively low reflectance for higher incidence angles, preferably in the range of 22 to 25 degrees, depicted by vertical lines 52. Also seen in FIG. 4C is a plot 53 (solid line) of reflectance vs. incidence angle for the facet 16*c* of FIG. 4A to satisfy these requirements; it is to be compared to a similar plot 54 (dashed line) for a conventional facet.

It is noted that similar design considerations may also be applied to the other facets in the LOE, thereby further reducing their visibility to an outside observer.

Figure 5A:
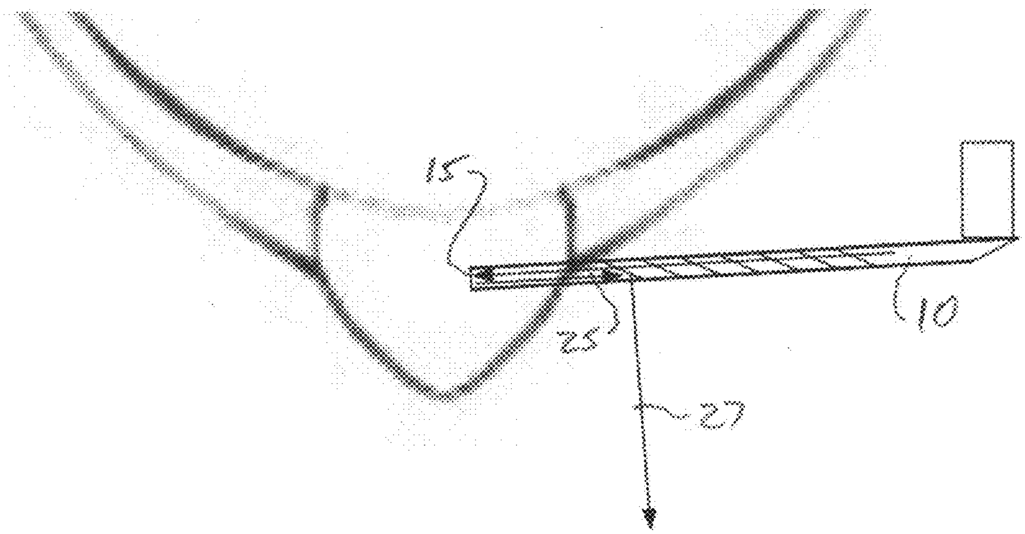
FIGS. 5A and 5B are each a sectional top view of the LOE of FIG. 4A, showing an end face without and with a light-absorbing layer, respectively.
Figure 5B:
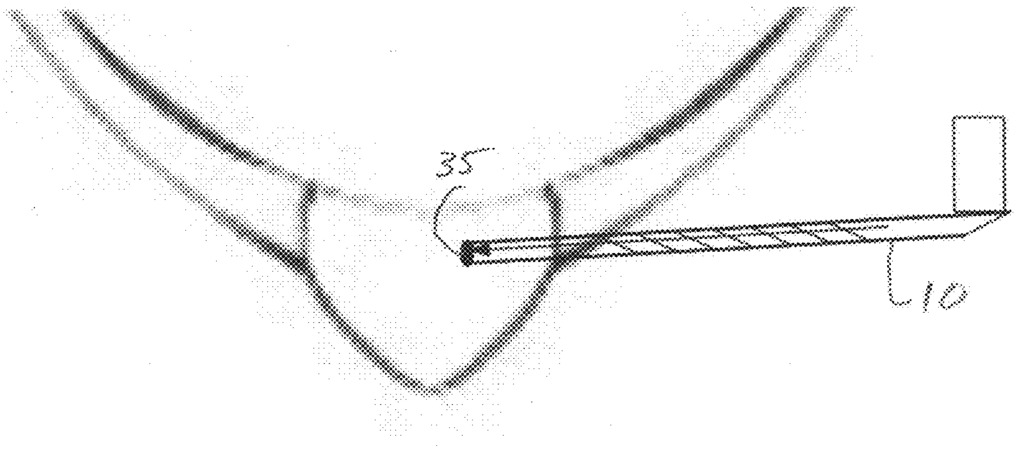

A further aspect of the present invention, useful alone or in combination with any one or more of the above aspects of the invention and applicable to all configurations of a lightguide (including diffractive waveguides), will now be disclosed with reference to FIGS. 5A and 5B. As illustrated in FIG. 5A, residual image-conveying light propagating along the LOE 10 and not coupled-out toward the viewing window continues and reaches an end surface 15 # of the LOE. At least part of this light will be reflected back from the end surface and will propagate in a reverse direction 25 along the LOE, where the coupling-out arrangement typically causes part of that light to be coupled outwards 27, away from the user. This may result in an undesirable glow, or glare, emanating from the LOE and visible by outside observers. This effect may be particularly pronounced with a LOE according to the first aspect of the present invention, since a relatively large proportion of the injected image intensity is transmitted by all of the facets and reaches the end surface 15.

In order to attenuate this effect, according to this aspect of the invention and as illustrated in FIG. 5B, a light-absorbent coating, film or layer 35 is applied to the end surface 15 of the LOE 10. The light-absorbent coating may advantageously be applied also to any of the other three side surfaces of the LOE. The light-absorbent coating 35 can conveniently be implemented as a layer of black paint. The coating in some embodiments may be configured to have a rough surface, which can be achieved by roughening the edge of the LOE prior to application of paint, or by employing a rough film or layer, which is bonded to the relevant side surface of the LOE using an optical adhesive or the like.

It should be noted that the orientation of the LOE as illustrated in the drawings may be regarded as a "side-injection" implementation, where the image illumination entering the LOE enters near a side edge and propagates sideway. It should be appreciated that all features shown are equally applicable to "top down" implementations, where an image is injected from the top of the LOE and propagates downward, which also fall within the scope of the invention. In certain cases, other intermediate orientations are also applicable, and are included within the scope of the present invention except where explicitly excluded.

It will be appreciated that the numerical examples in the above description are by way of example only and may vary in a design optimization process. It will also be appreciated that in various embodiments of the invention two or more of its aspects may be combined into an optimized design.

It will be appreciated that the above descriptions are intended only to serve as examples, and that many other embodiments are possible within the scope of the present invention as defined in the appended claims.

To the extent that the appended claims have been drafted without multiple dependencies, this has been done only to accommodate formal requirements in jurisdictions which do not allow such multiple dependencies. It should be noted that all possible combinations of features which would be implied by rendering the claims multiply dependent are explicitly envisaged and should be considered part of the invention.

The invention claimed is:

1. A light-guide optical element (LOE) for simultaneous viewing, by an eye of a viewer, of a real scene and of a projected image, conveyed by light that is polarized in a first orientation and introduced into the LOE, the LOE comprising:

a block of transparent material having a first major surface and a second major surface parallel to said first major surface so that light conveying the projected image introduced into the LOE propagates within the LOE by internal reflection at said first and second major surfaces, and a plurality of mutually-parallel partially reflecting surfaces internal to said block and obliquely oriented relative to said first major surface so as to couple-out a part of said light towards the eye of the viewer, wherein the reflectance of each of the partially reflecting surfaces in a direction normal to said major surfaces for light polarized in a second orientation, orthogonal to said first orientation, is less than one third of its reflectance in said direction for light polarized in said first orientation.

2. The LOE of claim 1, wherein said first polarized orientation is S-polarized relative to said partially reflecting surfaces.

3. The LOE of claim 2, wherein said partially reflecting surfaces are substantially transparent to P-polarization for an angular range of at least about 30 degrees including a direction normal to said first major surface.

4. The LOE of claim 1, wherein said block has an end surface onto which light propagating within the LOE that passes said partially reflecting surfaces impinges, wherein the end surface is coated with a light-absorbing layer, configured to absorb light introduced into the LOE and not coupled out.

5. The LOE of claim 4, wherein said light-absorbing layer is implemented as black paint applied to a rough end surface.

6. An optical system for simultaneous viewing, by a viewer, of a natural scene and of an image on a near-eye image projector, the optical system comprising:

a) the LOE of claim 1; and b) a support structure deployed to support the LOE on the head of the viewer in facing relation to at least one eye of the viewer.

7. The LOE of claim 2, wherein said block has an end surface onto which light propagating within the LOE that passes said partially reflecting surfaces impinges, wherein the end surface is coated with a light-absorbing layer, configured to absorb light introduced into the LOE and not coupled out.

8. The LOE of claim 3, wherein said block has an end surface onto which light propagating within the LOE that passes said partially reflecting surfaces impinges, wherein the end surface is coated with a light-absorbing layer, configured to absorb light introduced into the LOE and not coupled out.

9. An optical system for simultaneous viewing, by a viewer, of a natural scene and of an image on a near-eye image projector, the optical system comprising:

a) the LOE of claim 2; and b) a support structure deployed to support the LOE on the head of the viewer in facing relation to at least one eye of the viewer.

10. An optical system for simultaneous viewing, by a viewer, of a natural scene and of an image on a near-eye image projector, the optical system comprising:

a) the LOE of claim 3; and b) a support structure deployed to support the LOE on the head of the viewer in facing relation to at least one eye of the viewer.

11. A light-guide optical element (LOE) for simultaneous viewing, by an eye of a viewer, of a real scene and of a projected image introduced into the LOE, the LOE comprising a block of transparent material having a first major surface and a second major surface parallel to said first major surface so that light conveying the projected image, introduced into the LOE, propagates along the LOE in a first direction by internal reflection at said first and second major surfaces, there being defined, in a plane outside and parallel to said first major surface, an eye motion box of a given size, and a plurality of mutually-parallel partially reflecting surfaces internal to said block, arranged sequentially along said first direction and obliquely oriented relative to said first major surface so as to couple-out a part of said light towards the eye motion box, wherein the reflectance of the last one in sequence of said partially reflecting surfaces for the part of said light that is coupled out from it toward any point within the eye motion box is at least twice its reflectance for light travelling in a direction normal to said first and second major surfaces.

12. The LOE of claim 11, wherein the reflectance of the last one in sequence of said partially reflecting surfaces for the part of said light that is coupled out from it toward any point within the eye motion box is at least four times greater than its reflectance for light travelling in a direction normal to said first and second major surfaces.

13. The LOE of claim 11, wherein said block has an end surface onto which light propagating within the LOE that passes said partially reflecting surfaces impinges, wherein the end surface is coated with a light-absorbing layer, configured to absorb light introduced into the LOE and not coupled out.

14. The LOE of claim 12, wherein said block has an end surface onto which light propagating within the LOE that passes said partially reflecting surfaces impinges, wherein the end surface is coated with a light-absorbing layer, configured to absorb light introduced into the LOE and not coupled out.

15. An optical system for simultaneous viewing, by a viewer, of a natural scene and of an image on a near-eye image projector, the optical system comprising:

a) the LOE of claim 11; and b) a support structure deployed to support the LOE on the head of the viewer in facing relation to at least one eye of the viewer.

16. An optical system for simultaneous viewing, by a viewer, of a natural scene and of an image on a near-eye image projector, the optical system comprising:

a) the LOE of claim 12 and b) a support structure deployed to support the LOE on the head of the viewer in facing relation to at least one eye of the viewer.

* * * * *